(12) United States Patent
Ye et al.

(10) Patent No.: US 12,262,349 B2
(45) Date of Patent: Mar. 25, 2025

(54) MECHANISMS FOR INDICATING BEAM DIRECTIONS

(71) Applicant: Apple Inc., Cupertino, CA (US)

(72) Inventors: Sigen Ye, Whitehouse Station, NJ (US); Oghenekome Oteri, San Diego, CA (US); Haitong Sun, Irvine, CA (US); Yushu Zhang, Beijing (CN); Weidong Yang, San Diego, CA (US); Wei Zeng, San Diego, CA (US); Huaning Niu, San Jose, CA (US); Chunxuan Ye, San Diego, CA (US); Hong He, Cupertino, CA (US); Chunhai Yao, Beijing (CN); Dawei Zhang, Saratoga, CA (US)

(73) Assignee: Apple Inc., Cupertino, CA (US)

(*) Notice: Subject to any disclaimer, the term of this patent is extended or adjusted under 35 U.S.C. 154(b) by 270 days.

(21) Appl. No.: 17/438,044

(22) PCT Filed: Oct. 15, 2020

(86) PCT No.: PCT/CN2020/121221
§ 371 (c)(1),
(2) Date: Sep. 10, 2021

(87) PCT Pub. No.: WO2022/077361
PCT Pub. Date: Apr. 21, 2022

(65) Prior Publication Data
US 2022/0303950 A1    Sep. 22, 2022

(51) Int. Cl.
*H04W 72/02* (2009.01)
*H04W 16/28* (2009.01)
(Continued)

(52) U.S. Cl.
CPC ............ *H04W 72/02* (2013.01); *H04W 16/28* (2013.01); *H04W 72/0446* (2013.01); *H04W 72/046* (2013.01); *H04W 72/23* (2023.01)

(58) Field of Classification Search
None
See application file for complete search history.

(56) References Cited

U.S. PATENT DOCUMENTS 10,110,326 B1 * 10/2018 Kyrolainen ............ H04B 17/29
2016/0360531 A1 * 12/2016 Moon ............... H04W 72/0453
(Continued)

FOREIGN PATENT DOCUMENTS

CN    107852220       3/2018
CN    108781432 A    11/2018
(Continued)

OTHER PUBLICATIONS

International Search Report for PCT Patent Application No. PCT/CN2020/121221; mailed Jul. 20, 2021.
(Continued)

*Primary Examiner* — Otis L Thompson, Jr.
(74) *Attorney, Agent, or Firm* — Kowert, Hood, Munyon, Rankin & Goetzel, P.C.

(57) ABSTRACT

A base station may transmit beam indication information to one or more user equipment (UE) devices. For each of a plurality of time units (e.g., symbols) in a time interval (e.g., spanning one or more slots), the beam indication information indicates a corresponding beam that the base station will use to transmit or receive. A UE device may have knowledge of the beam in which it currently resides, e.g., by performing power measurements during a beam scan procedure. Thus, the beam indication information enables the UE to perform transmissions and/or receptions (e.g., configured transmissions and/or receptions) during the appropriate time unit(s). The beam indication information may be dynamically transmitted as part of downlink control information. This trans-
(Continued)

800 transmit downlink control information (DCI) including beam indication information, wherein the beam indication information indicates:

one or more temporal units in a sequence of temporal units in a temporal interval; and for each of the one or more temporal units, a corresponding index of a beam to be used for base station transmission or base station reception during that temporal unit, wherein the corresponding beam index is selected from an available set of beam indices  810 mission may omni-directional, wide beam, or narrow beam. Various schemes of encoding the beam indication information are contemplated.

19 Claims, 8 Drawing Sheets

(51) Int. Cl.
*H04W 72/044* (2023.01)
*H04W 72/0446* (2023.01)
*H04W 72/23* (2023.01)

(56) References Cited

U.S. PATENT DOCUMENTS

| | | | |
|---|---|---|---|
| 2019/0081672 A1* | 3/2019 | Hwang | H04B 7/0413 |
| 2019/0215896 A1* | 7/2019 | Zhou | H04L 1/0027 |
| 2019/0254120 A1 | 8/2019 | Zhang et al. | |
| 2019/0260524 A1* | 8/2019 | Nam | H04L 27/0014 |
| 2019/0297603 A1 | 9/2019 | Guo et al. | |
| 2019/0335441 A1* | 10/2019 | Bai | H04L 5/0053 |
| 2020/0036556 A1* | 1/2020 | Wei | H04W 72/21 |
| 2020/0106566 A1* | 4/2020 | Yeo | H04L 1/1854 |
| 2020/0113010 A1* | 4/2020 | John Wilson | H04W 72/21 |
| 2020/0119869 A1* | 4/2020 | Taherzadeh Boroujeni | H04B 7/0695 |
| 2020/0154409 A1 | 5/2020 | Kang | |
| 2020/0228267 A1 | 7/2020 | Park | |
| 2020/0244503 A1* | 7/2020 | Bala | H04L 5/0044 |
| 2020/0314857 A1 | 10/2020 | Pezeshki | |
| 2022/0103228 A1* | 3/2022 | Zhang | H04B 7/063 |
| 2023/0148282 A1* | 5/2023 | Marinier | H04W 72/0446 370/329 |
| 2023/0354357 A1* | 11/2023 | Gong | H04L 1/0045 |
| 2023/0371039 A1* | 11/2023 | Tsai | H04W 72/232 |

FOREIGN PATENT DOCUMENTS

| | | |
|---|---|---|
| CN | 110663282 A | 1/2020 |
| CN | 111480303 | 7/2020 |
| CN | 111656839 | 9/2020 |
| WO | 2017083514 | 5/2017 |

OTHER PUBLICATIONS

Office Action for Chinese Application for Invention No. 202080106221.0; Jun. 6, 2024.
Notice of Grant for CN 202080106221.0; Jan. 28, 2025.

* cited by examiner

800 

> transmit downlink control information (DCI) including beam indication information, wherein the beam indication information indicates:
>
> one or more temporal units in a sequence of temporal units in a temporal interval; and
>
> for each of the one or more temporal units, a corresponding index of a beam to be used for base station transmission or base station reception during that temporal unit, wherein the corresponding beam index is selected from an available set of beam indices  810

*FIG. 8*

900 

> receive downlink control information (DCI) including beam indication information, wherein the beam indication information indicates:
>
> one or more temporal units in a sequence of temporal units in a temporal interval; and
>
> for each of the one or more temporal units, a corresponding index of a beam to be used by a base station to perform downlink transmission or uplink reception during that temporal unit, wherein the corresponding beam index is selected from an available set of beam indices.  910

*FIG. 9*

1300 

transmit downlink control information (DCI) including beam indication information, wherein the beam indication information indicates an index of a beam to be used for base station transmission or base station reception during a particular temporal unit in a temporal interval.  1310

*FIG. 13*

1400 

receive downlink control information (DCI) including beam indication information, wherein the beam indication information indicates an index of a beam to be used by a base station to perform downlink transmission or uplink reception during a particular temporal unit in a temporal interval  1410

*FIG. 14*

MECHANISMS FOR INDICATING BEAM DIRECTIONS

Priority Claim Information

This application is a U.S. national stage application of International Application No. PCT/CN2020/121221, filed on Oct. 15, 2020, titled "Mechanisms for Indicating Beam Directions", which is hereby incorporated by reference in its entirety. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present disclosure relates to the field of wireless communication, and more particularly, to mechanisms for signaling beam indication information to user equipment (UE) devices.

DESCRIPTION OF THE RELATED ART

When a base station transmits to a user equipment (UE) device using high frequencies, e.g., frequencies in the millimeter wave band or higher, beam forming may be necessary to overcome the issues of high path loss and poor penetration of solid materials. Different UEs may be served by different beams in a time division multiplexing (TDM) fashion. Thus, if the UE attempts to receive (or transmit) when the base station's transmission beam (or reception beam) is not pointed at the UE, the attempted communication may fail. Thus, there exists a need to improve the handling of communications at high frequencies.

SUMMARY

In some embodiments, a base station may transmit beam indication information to one or more user equipment (UE) devices. For each of a plurality of time units (e.g., symbols) in a time interval (e.g., a time interval spanning one or more slots), the beam indication information indicates a corresponding beam that the base station will use for transmission or reception. A UE device may know the beam in which it resides, e.g., by performing power measurements during a beam-scan procedure. (The base station may scan a narrow transmit beam over a field of directions, to enable each UE to recognize the beam in which it resides.) Thus, the beam indication information enables the UE to perform transmissions and/or receptions (e.g., configured transmissions and/or receptions) during appropriate time units. The beam indication information may be dynamically transmitted as downlink control information, e.g., in a physical downlink control channel (PDCCH). This transmission may omni-directional, wide beam, or narrow beam. Various schemes of encoding the beam indication information are contemplated.

In some embodiments, a method for operating a base station (BS) may include one or more of the following operations. The method may include transmitting downlink control information (DCI) including beam indication information. The beam indication information may indicate: one or more temporal units in a sequence of temporal units in a temporal interval; and for each of the one or more temporal units, a corresponding index of a beam to be used for base station transmission or base station reception during that temporal unit. The corresponding beam index may be selected from an available set of beam indices.

The DCI may be a group common message or a UE-specific message. The DCI may include beam indication information for one or more carriers hosted by the base station. The DCI may also include (or not include) a dynamic slot format indication.

In some embodiments, the one or more temporal units indicated by the beam indication information may be constrained to be among temporal units whose beam indications are not semi-statically configured.

In some embodiments, the beam indication information may apply only to a selected subset of a set of configured transfers. The set of configured transfers may include (or consist of) one or more configured downlink transmissions and/or one or more configured uplink receptions. The selected subset may be indicated to one or more UEs by configuration signaling (e.g., RRC signaling), or predefined.

In some embodiments, one of the beam indices of said available set may represent an unknown state. In these embodiments, the beam indication information may be set so it indicates the unknown state for a particular temporal unit. This setting may direct a user equipment (UE) device to perform a configured transmission or reception during the particular temporal unit.

In some embodiments, one of the beam indices of said available set represents an unknown state. In these embodiments, the beam indication information may be set so it indicates the unknown state for a particular temporal unit. This setting may direct a user equipment (UE) device to not perform any configured transmission or reception during the particular temporal unit.

In some embodiments, the beam indices of the available set may include (or be) Synchronization Signal Block (SSB) indices.

In some embodiments, the beam configuration information may indicate a beam for a temporal unit by indicating a Transmission Configuration Indication (TCI) state or spatial relation for the temporal unit.

In some embodiments, the DCI may be transmitted omni-directionally, in a wide beam fashion, or in a narrow-beam fashion.

In some embodiments, the DCI may be transmitted using a same beam as a UE-specific transmission in one of the temporal units, in which case, the beam indication information may include symbol indication information only for said beam.

In some embodiments, the DCI may be transmitted using a beam that corresponds to one of the beam indices of the available set. In these embodiments, the beam index may be included in the DCI; or the DCI may be scrambled with the beam index; or a Cyclic Redundancy Check (CRC) of the DCI may be scrambled with the beam index.

In some embodiments, the DCI may be transmitted using a beam that (a) includes a plurality of UE-specific communication beams and (b) not omni-directional. In these embodiments, the beam indication information may be limited to information relating to the plurality of UE-specific communication beams.

In some embodiments, a first of the one or more beams may be used for base station transmission, wherein a second of the one or more beams may be used for base station reception.

In some embodiments, the one or more temporal units may be limited to temporal units corresponding to semi-statically configured transfers. A semi-statically configured transfer is a semi-statically configured downlink transmission or a semi-statically configured uplink reception.

In some embodiments, the beam indication information may indicate a beam pattern from a predetermined list of beam patterns, wherein each of the beam patterns specifies a beam index for each of the temporal units of the temporal interval.

In some embodiments, the beam indication information may indicate a virtual beam pattern from a predetermined list of virtual beam patterns, wherein each of the virtual beam patterns specifies a virtual beam index for each of the temporal units of the temporal interval. The beam indication information may also include a mapping of the virtual beam indices to corresponding actual beam indices.

In some embodiments, a method for operating a user equipment (UE) device may include one or more of the following operations. The method may include receiving downlink control information (DCI) including beam indication information. The beam indication information may indicate: one or more temporal units of a sequence of temporal units in a temporal interval; and for each of the one or more temporal units, a corresponding index of a beam to be used by a base station to perform downlink transmission or uplink reception during that temporal unit. The corresponding beam index may be selected from an available set of beam indices.

The downlink control information may be a group common message of a UE-specific message. The DCI may include beam indication information for one or more carriers.

In some embodiments, for each of the one or more temporal units, the DCI may also include an indication of an uplink or downlink direction of data flow during that temporal interval.

In some embodiments, the one or more temporal units indicated by the beam indication information are constrained to be among temporal units whose beam indications are not semi-statically configured.

In some embodiments, the beam indication information may apply only to a selected subset of a set of configured transfers. The set of configured transfers may include (or consist of) one or more configured uplink transmissions and/or one or more configured downlink receptions. The selected subset may be determined by received configuration signaling (e.g., RRC signaling from the base station), or predefined (e.g., by an agreement expressed in a wireless communication standard).

In some embodiments, one of the beam indices of said available set represents an unknown state. In these embodiments, the method may also include, in response to determining that the beam indication information is set so that it indicates the unknown state for a particular temporal unit, performing a configured transmission or reception during the particular temporal unit.

In some embodiments, one of the beam indices of said available set represents an unknown state. In these embodiments, the method may also include, in response to determining that the beam indication information is set so that it indicates the unknown state for a particular temporal unit, refraining from performing any configured transmission or reception during the particular temporal unit.

In some embodiments, the beam indices of the available set may include SSB indices.

In some embodiments, the beam configuration information may indicate a beam for a temporal unit by indicating a Transmission Configuration Indication (TCI) state or spatial relation for the temporal unit.

In some embodiments, the beam indication information may be limited to information relating to a beam used to transmit the DCI.

In some embodiments, the method may also include determining whether a first beam used to transmit the DCI is the same as a second beam in which the UE resides. In different embodiments, said determining may include: recovering a beam index included in the DCI and comparing that beam index to a beam index of the second beam; or attempting to descramble the DCI using a beam index of the second beam; or attempting to descramble a CRC of the DCI using a beam index of the second beam.

In some embodiments, the beam indication information may be limited to information relating to two or more UE-specific beams contained within a beam used to transmit the DCI.

In some embodiments, a first of the one or more beams may be used for transmission by the UE device, wherein a second of the one or more beams may be used for reception by the UE device.

In some embodiments, the one or more temporal units may be limited to temporal units corresponding to semi-statically configured transfers. A semi-statically configured transfer is a semi-statically configured uplink transmission from the UE and/or a semi-statically configured downlink reception by the UE.

In some embodiments, the beam indication information may indicate a beam pattern from a predetermined list of beam patterns, where each of the beam patterns specifies a beam index for each of the temporal units of the temporal interval.

In some embodiments, the beam indication information indicates a virtual beam pattern from a predetermined list of virtual beam patterns, wherein each of the virtual beam patterns specifies a virtual beam index for each of the temporal units of the temporal interval.

In some embodiments, the method may also include performing a scheduled transmission or scheduled reception of data in one of the one or more temporal units without reference to a beam index indicated by the beam indication information.

BRIEF DESCRIPTION OF THE DRAWINGS

A better understanding of the present subject matter can be obtained when the following detailed description of the preferred embodiment is considered in conjunction with the following drawings.

FIG. 8 illustrates a method for transmitting beam indication information from a base station, according to some embodiments.

FIG. 9 illustrates a method for receiving beam indication information at a user equipment (UE) device, according to some embodiments.

FIG. 13 illustrates a method for operating a base station to dynamically indicate a beam to be used by the base station during a particular temporal unit in a temporal interval, according to some embodiments.

FIG. 14 illustrates a method for operating a user equipment (UE) device to receive a dynamic indication of a beam to be used by a base station during a particular temporal unit in a temporal interval, according to some embodiments.

Figure 1:
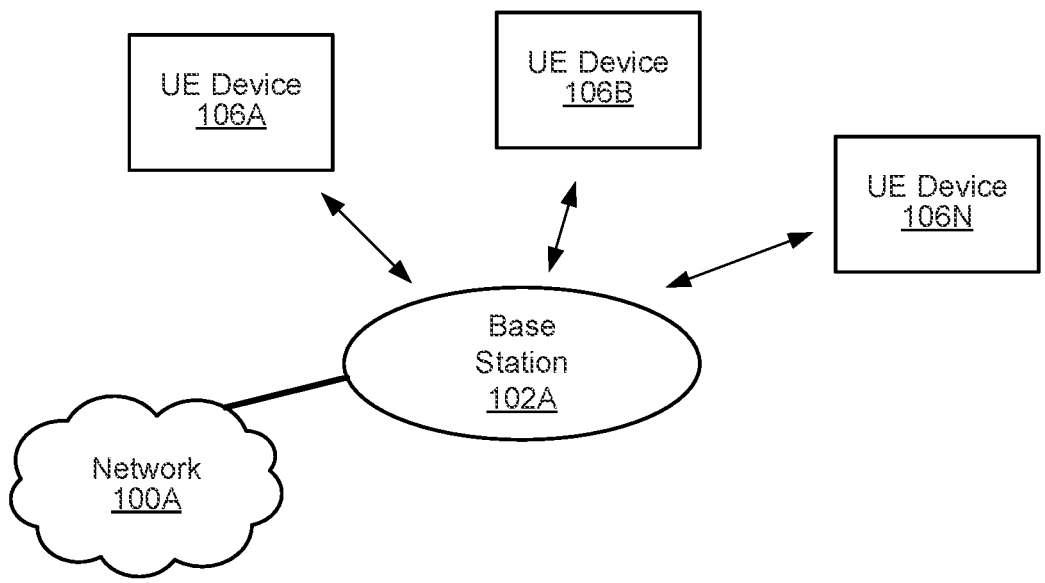
FIGS. 1-2 illustrate examples of wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in this disclosure.
3GPP: Third Generation Partnership Project
3GPP2: Third Generation Partnership Project 2
5G NR: $5^{th}$ Generation New Radio
BW: Bandwidth
BWP: Bandwidth Part
CRC: Cyclic Redundancy Check
CSI: Channel State Information
CSI-RS: CSI Reference Signal
DCI: Downlink Control Information
DL: Downlink
eNB (or eNodeB): Evolved Node B, i.e., the base station of 3GPP LTE
gNB (or gNodeB): next Generation NodeB, i.e., the base station of 5G NR
GSM: Global System for Mobile Communications
HARQ: Hybrid ARQ
LTE: Long Term Evolution
LTE-A: LTE-Advanced
MAC: Media Access Control
MAC-CE: MAC Control Element
NR: New Radio
NR-DC: NR Dual Connectivity
NW: Network
PDCCH: Physical Downlink Control Channel
RAT: Radio Access Technology
RNTI: Radio Network Temporary Identifier
RRC: Radio Resource Control
RRM: Radio Resource Management
RS: Reference Signal
SR: Scheduling Request
SSB: Synchronization Signal Block
TCI: Transmission Configuration Indication
UE: User Equipment
UL: Uplink
UMTS: Universal Mobile Telecommunications System

Terms

The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to any of various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
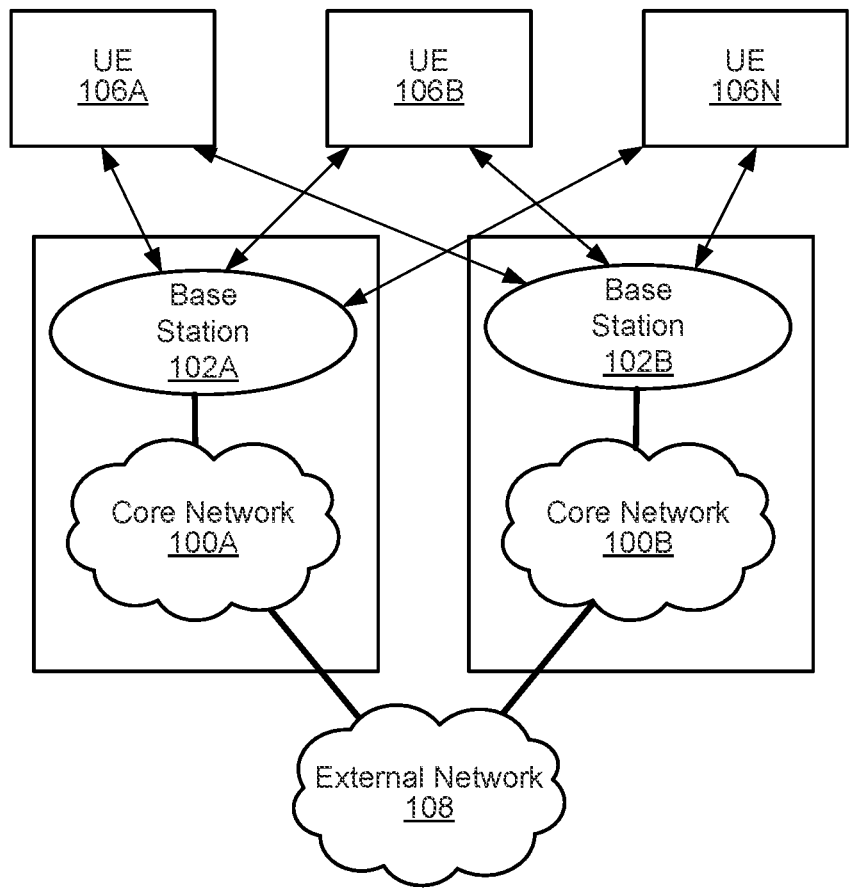
Figure 3:
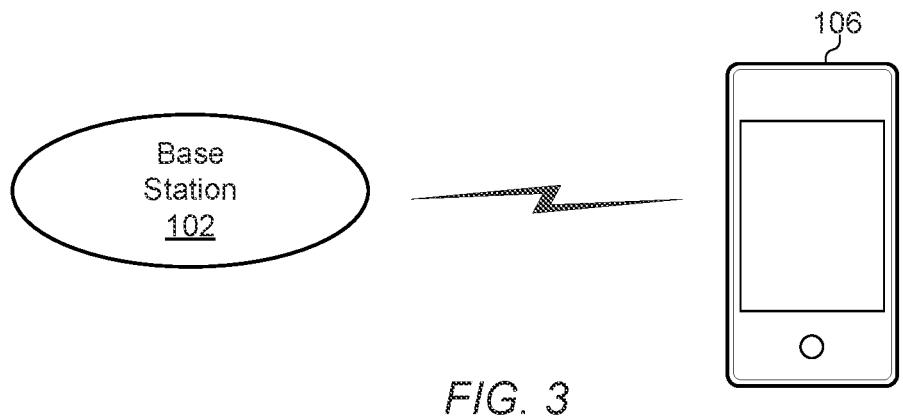
FIG. 3 illustrates an example of a base station in communication with a user equipment device, according to some embodiments.

FIGS. 1-3: Communication System

FIGS. 1 and 2 illustrate exemplary (and simplified) wireless communication systems. It is noted that the systems of FIGS. 1 and 2 are merely examples of certain possible systems, and various embodiments may be implemented in any of various ways, as desired.

The wireless communication system of FIG. 1 includes a base station 102A which communicates over a transmission medium with one or more user equipment (UE) devices 106A, 106B, etc., through 106N. Each of the user equipment devices may be referred to herein as "user equipment" (UE). In the wireless communication system of FIG. 2, in addition to the base station 102A, base station 102B also communicates (e.g., simultaneously or concurrently) over a transmission medium with the UE devices 106A, 106B, etc., through 106N.

The base stations 102A and 102B may be base transceiver stations (BTSs) or cell sites, and may include hardware that enables wireless communication with the user devices 106A through 106N. Each base station 102 may also be equipped to communicate with a core network 100 (e.g., base station 102A may be coupled to core network 100A, while base station 102B may be coupled to core network 100B), which may be a core network of a cellular service provider. Each core network 100 may be coupled to one or more external networks (such as external network 108), which may include the Internet, a Public Switched Telephone Network (PSTN), or any other network. Thus, the base station 102A may facilitate communication between the user devices and/or between the user devices and the network 100A; in the system of FIG. 2, the base station 102B may facilitate communication between the user devices and/or between the user devices and the network 100B.

The base stations 102A and 102B and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1xRTT, 1xEV-DO, HRPD, eHRPD), Wi-Fi, WiMAX etc.

For example, base station 102A and core network 100A may operate according to a first cellular communication standard (e.g., LTE) while base station 102B and core network 100B operate according to a second (e.g., different) cellular communication standard (e.g., GSM, UMTS, and/or one or more CDMA 2000 cellular communication standards). The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the network configuration shown in FIG. 2, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., LTE and CDMA 1xRTT, GSM and UMTS, or any other combination of cellular communication technologies) might be coupled to a core network that also supports the different cellular communication technologies. Any of various other network deployment scenarios are also possible.

As a further possibility, it is also possible that base station 102A and base station 102B may operate according to the same wireless communication technology (or an overlapping set of wireless communication technologies). For example, base station 102A and core network 100A may be operated by one cellular service provider independently of base station 102B and core network 100B, which may be operated by a different (e.g., competing) cellular service provider. Thus in this case, despite utilizing similar and possibly compatible cellular communication technologies, the UE devices 106A-106N might communicate with the base stations 102A-102B independently, possibly by utilizing separate subscriber identities to communicate with different carriers' networks.

A UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). As another example, a UE 106 might be configured to communicate using different 3GPP cellular communication standards (such as two or more of GSM, UMTS, LTE, or LTE-A). Thus, as noted above, a UE 106 might be configured to communicate with base station 102A (and/or other base stations) according to a first cellular communication standard (e.g., LTE) and might also be configured to communicate with base station 102B (and/or other base stations) according to a second cellular communication standard (e.g., one or more CDMA2000 cellular communication standards, UMTS, GSM, etc.).

Base stations 102A and 102B and other base stations operating according to the same or different cellular communication standards may thus be provided as one or more networks of cells, which may provide continuous or nearly continuous overlapping service to UEs 106A-106N and similar devices over a wide geographic area via one or more cellular communication standards.

A UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 3 illustrates user equipment 106 (e.g., one of the devices 106A through 106N) in communication with a base station 102 (e.g., one of the base stations 102A or 102B). The UE 106 may be a device with wireless network connectivity such as a mobile phone, a hand-held device, a computer or a tablet, a wearable device or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UMTS (W-CDMA, TD-SCDMA, etc.), CDMA2000 (1xRTT, 1xEV-DO, HRPD, eHRPD, etc.), LTE, LTE-A, WLAN, or GNSS. Other combinations of wireless communication standards are also possible.

The UE 106 may include one or more antennas for communicating using one or more wireless communication protocols. Within the UE 106, one or more parts of a receive and/or transmit chain may be shared between multiple wireless communication standards; for example, the UE 106 might be configured to communicate using either (or both) of GSM or LTE using a single shared radio. The shared radio may include a single antenna, or may include multiple antennas (e.g., for MIMO or beamforming) for performing wireless communications. MIMO is an acronym for Multi-Input Multiple-Output.

Figure 4:
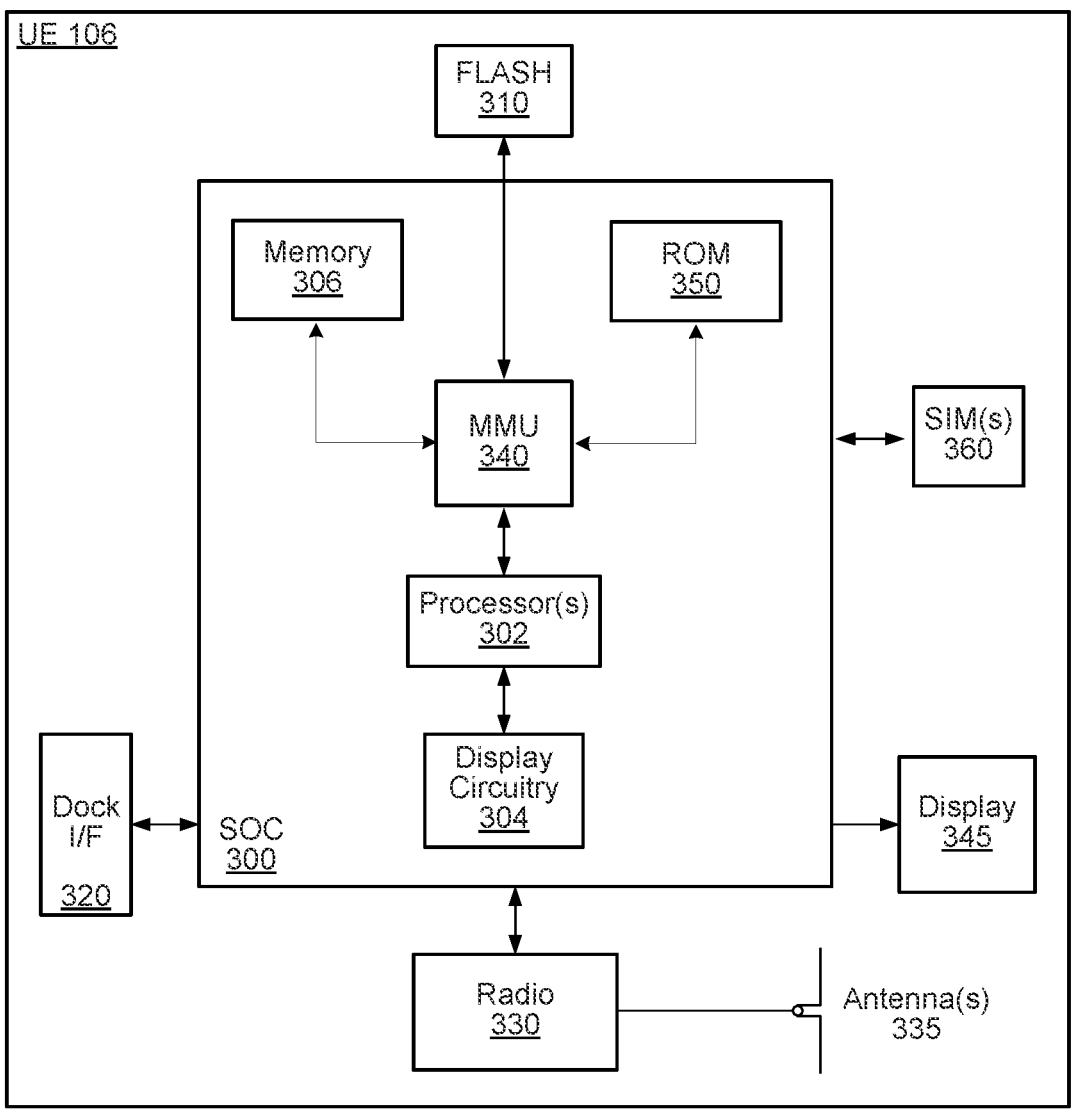
FIG. 4 illustrates an example of a block diagram of a user equipment device, according to some embodiments.

FIG. 4—Example of Block Diagram of a UE

FIG. 4 illustrates an example of a block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including Flash memory 310), a connector interface 320 (e.g., for coupling to a computer system, dock, charging station, etc.), the display 345, and radio 330.

The radio 330 may include one or more RF chains. Each RF chain may include a transmit chain, a receive chain, or both. For example, radio 330 may include two RF chains to support dual connectivity with two base stations (or two cells). The radio may be configured to support wireless communication according to one or more wireless communication standards, e.g., one or more of GSM, UMTS, LTE, LTE-A, WCDMA, CDMA2000, Bluetooth, Wi-Fi, GPS, etc.

The radio 330 couples to antenna subsystem 335, which includes one or more antennas. For example, the antenna subsystem 335 may include a plurality of antennas to support applications such as dual connectivity or MIMO or beamforming. The antenna subsystem 335 transmits and receives radio signals to/from one or more base stations or devices through the radio propagation medium, which is typically the atmosphere.

In some embodiments, the processor(s) 302 may include a baseband processor to generate uplink baseband signals and/or to process downlink baseband signals. The processor(s) 302 may be configured to perform data processing according to one or more wireless telecommunication standards, e.g., one or more of GSM, UMTS, LTE, LTE-A, WCDMA, CDMA2000, Bluetooth, Wi-Fi, GPS, etc.

The UE 106 may also include one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more sensors, one or more buttons, sliders, and/or dials, and/or any of various other elements capable of providing information to a user and/or receiving/interpreting user input.

As shown, the UE 106 may also include one or more subscriber identity modules (SIMs) 360. Each of the one or more SIMs may be implemented as an embedded SIM (eSIM), in which case the SIM may be implemented in device hardware and/or software. For example, in some embodiments, the UE 106 may include an embedded UICC (eUICC), e.g., a device which is built into the UE 106 and is not removable. The eUICC may be programmable, such that one or more eSIMs may be implemented on the eUICC. In other embodiments, the eSIM may be installed in UE 106 software, e.g., as program instructions stored on a memory medium (such as memory 306 or Flash 310) executing on a processor (such as processor 302) in the UE 106. As one example, a SIM 360 may be an application which executes on a Universal Integrated Circuit Card (UICC). Alternatively, or in addition, one or more of the SIMs 360 may be implemented as removable SIM cards.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as or include: a programmable hardware element, such as an FPGA (Field Programmable Gate Array); or an ASIC (Application Specific Integrated Circuit); or a combination thereof.

Figure 5:
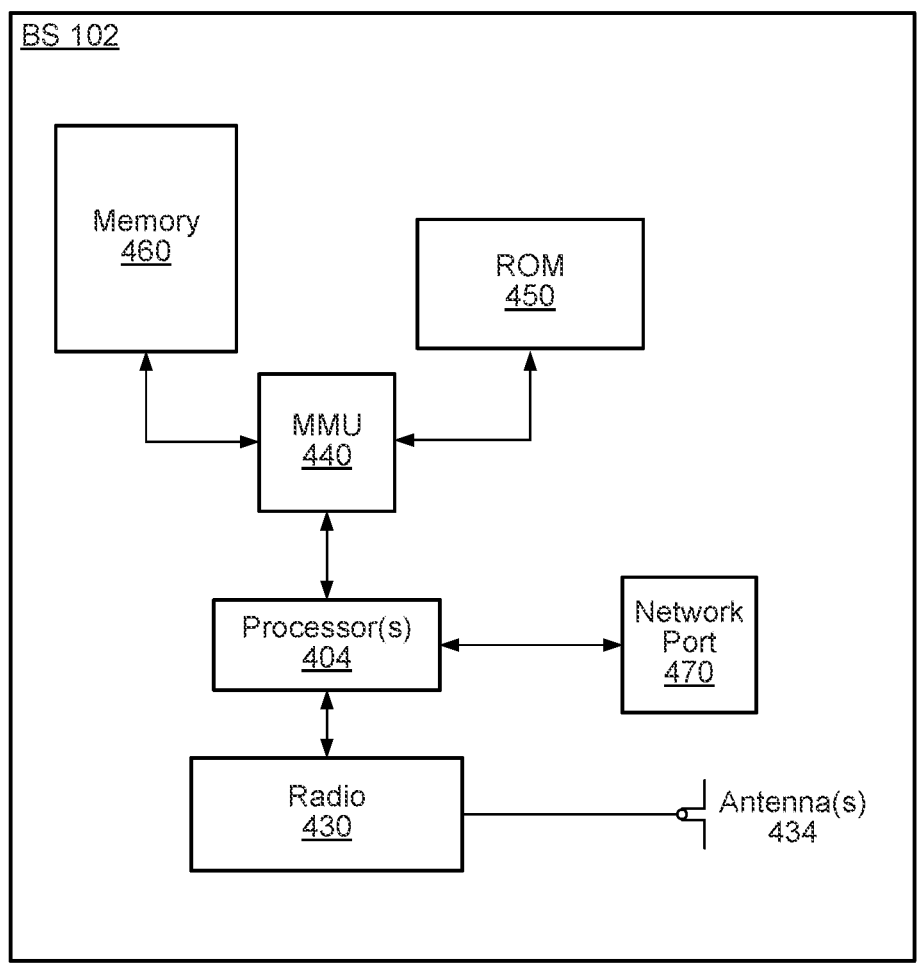
FIG. 5 illustrates an example of a block diagram of a base station, according to some embodiments.

FIG. 5—Example of a Base Station

FIG. 5 illustrates a block diagram of a base station 102. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory ROM 450) or to other circuits or devices.

The base station 102 may include at least one network port 470. The network port 470 may be configured to couple to a telephone network and provide access (for a plurality of devices, such as UE devices 106) to the telephone network, as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430 having one or more RF chains. Each RF chain may include a transmit chain, a receive chain, or both. (For example, the base station 102 may include at least one RF chain per sector or cell.) The radio 430 couples to antenna subsystem 434, which includes one or more antennas. Multiple antennas would be needed, e.g., to support applications such as MIMO or beamforming. The antenna subsystem 434 transmits and receives radio signals to/from UEs through the radio propagation medium (typically the atmosphere).

In some embodiments, the processor(s) 404 may include a baseband processor to generate downlink baseband signals and/or to process uplink baseband signals. The baseband processor 430 may be configured to operate according to one or more wireless telecommunication standards, including, but not limited to, GSM, LTE, WCDMA, CDMA2000, etc.

The processor(s) 404 of the base station 102 may be configured to implement part or all of the methods described herein, e.g., by executing program instructions stored on a memory medium (e.g., a non-transitory computer-readable memory medium). In some embodiments, the processor(s) 404 may include: a programmable hardware element, such as an FPGA (Field Programmable Gate Array); or an ASIC (Application Specific Integrated Circuit); or a combination thereof.

Figure 6:
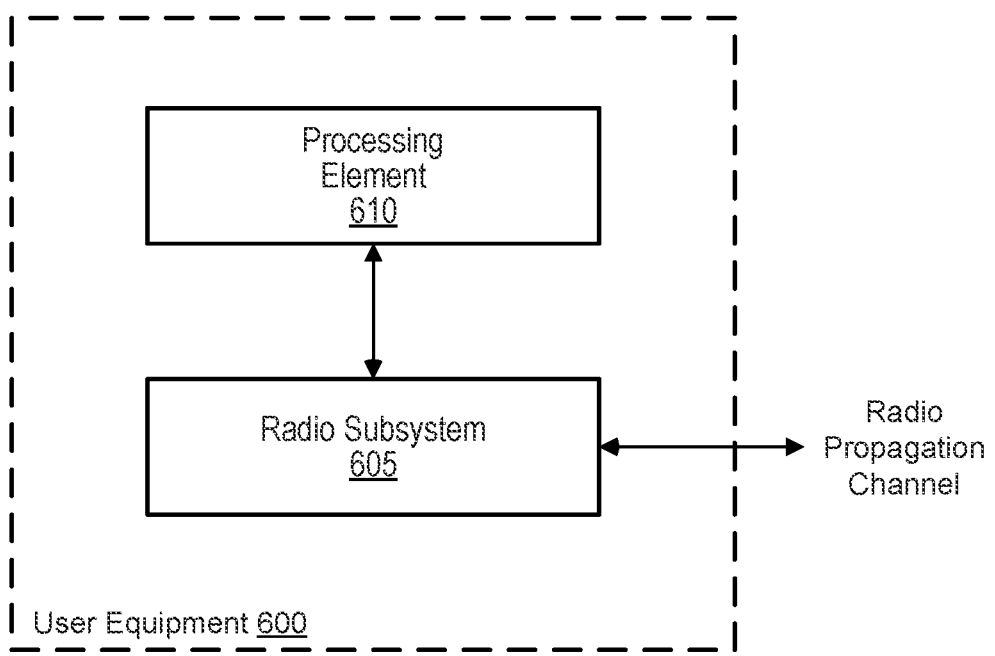
FIG. 6 illustrates an example of a user equipment 600, according to some embodiments.

In some embodiments, a wireless user equipment (UE) device 600 may be configured as shown in FIG. 6. UE device 600 may include: a radio subsystem 605 for performing wireless communication; and a processing element 610 operatively coupled to the radio subsystem. (UE device 600 may also include any subset of the UE features described above, e.g., in connection with FIGS. 1-4.)

The radio subsystem 605 may include one or more RF chains, e.g., as variously described above. Each RF chain may be configured to receive signals from the radio propagation channel and/or transmit signals onto the radio propagation channel. Thus, each RF chain may include a transmit chain and/or a receive chain. The radio subsystem 605 may be coupled to one or more antennas (or, one or more arrays of antennas) to facilitate signal transmission and reception. Each RF chain (or, some of the RF chains) may be tunable to a desired frequency, thus allowing the RF chain to receive or transmit at different frequencies at different times.

The processing element 610 may be coupled to the radio subsystem, and may be configured as variously described above. (For example, processing element may be realized by processor(s) 302.) The processing element may be configured to control the state of each RF chain in the radio subsystem.

In some embodiments, the processing element may include one or more baseband processors to (a) generate baseband signals to be transmitted by the radio subsystem and/or (b) process baseband signals provided by the radio subsystem.

In a dual connectivity mode of operation, the processing element may direct a first RF chain to communicate with a first base station using a first radio access technology and direct a second RF chain to communicate with a second base station using a second radio access technology. For example, the first RF chain may communicate with an LTE eNB, and the second RF chain may communicate with a gNB of 5G New Radio (NR). The link with the LTE eNB may be referred to as the LTE branch. The link with the gNB may be referred to as the NR branch. In some embodiments, the processing element may include a first subcircuit for baseband processing with respect to the LTE branch and a second subcircuit for baseband processing with respect to the NR branch.

The processing element 610 may be further configured as variously described in the sections below.

Figure 7:
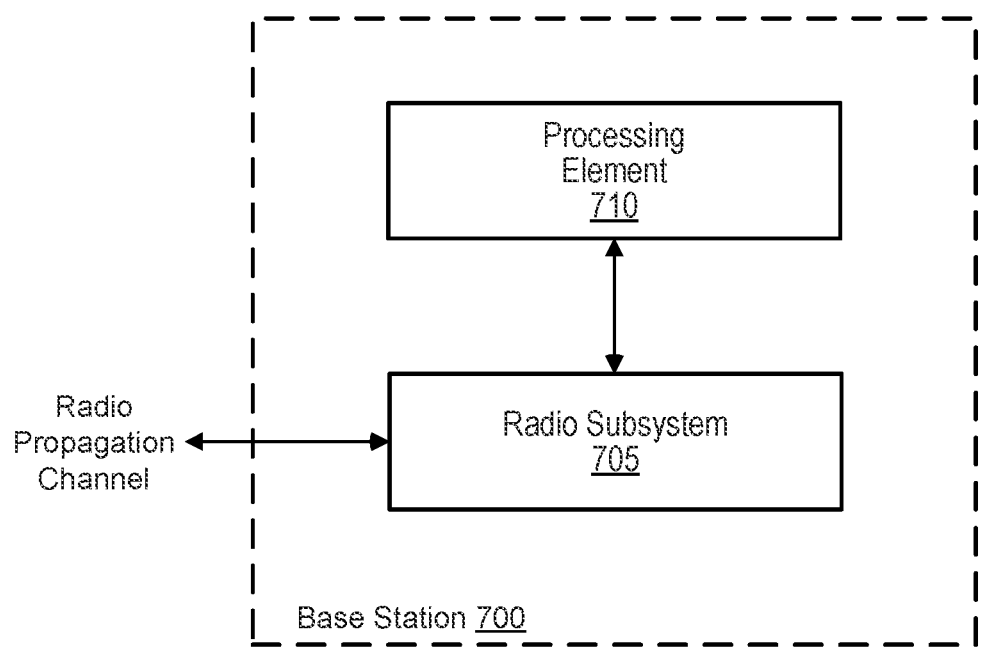
FIG. 7 illustrates an example of a base station 700, according to some embodiments. The base station 700 may be used to communicate with user equipment 600 of FIG. 6.

In some embodiments, a wireless base station 700 of a wireless network (not shown) may be configured as shown in FIG. 7. The wireless base station may include: a radio subsystem 705 for performing wireless communication over a radio propagation channel; and a processing element 710 operatively coupled to the radio subsystem. (The wireless base station may also include any subset of the base station features described above, e.g., the features described above in connection with FIG. 5.)

The radio subsystem 705 may include one or more RF chains. Each RF chain may be tunable to a desired frequency, thus allowing the RF chain to receive or transmit at different frequencies at different times. The radio subsystem 705 may be coupled to an antenna subsystem, including one or more antennas, e.g., an array of antenna, or a plurality of antenna arrays. The radio subsystem may employ the antenna subsystem to transmit and receive radio signals to/from radio wave propagation medium.

The processing element 710 may be realized as variously described above. For example, in one embodiment, processing element 710 may be realized by processor(s) 404. In some embodiments, the processing element may include one or more baseband processors to: (a) generate baseband signals to be transmitted by the radio subsystem, and/or, (b) process baseband signals provided by the radio subsystem.

The processing element 710 may be configured to perform any of the base station method embodiments described herein.

Mechanisms for Indicating Beam Directions

In some embodiments, a base station (such as a gNB of 3GPP 5GNR) may employ a number of transmit (Tx) beams and/or a number of receive (Rx) beams, especially when operating at high frequencies, e.g., in the FR2 frequency range of 5GNR. (For example, in Releases 15 and 16 of 5GNR, up to 64 Tx/Rx beams may be employed. The number of beams may increase further for frequencies above 52.6 GHz.) The directions of the beams may be arranged to cover a cell coverage area. The beam directions may vary over one or two angular dimensions, e.g., over a range of azimuth angle, or over a 2D range of azimuth and elevation. Each of the beams may be have a corresponding index value.

The beams may need to be narrow, e.g., to provide sufficient gain for communication with the UE. (Antenna gain is related inversely to beam width.) In the case of analog beamforming UEs in different beams may be served in a Time-Domain Multiplexing (TDM) fashion. It may be difficult to simultaneously transmit two or more beams when beam forming is performed in the analog domain.

If a UE attempts to receive (or transmit) at a time when the base station is using a transmit beam (or receive beam) not covering the UE, the reception (or transmission) may be unsuccessful. Thus, it is desirable for the UE to attempt reception (or transmission) with the base station at those times when the base station is using the appropriate transmit beam (or reception beam), i.e., a beam that covers the UE.

Operation of the base station and UE devices in a legacy fashion (e.g., according to existing 3GPP 5GNR specifications) may result in system inefficiencies or less flexibility in system behavior or waste of UE power. For example, a UE may perform unnecessary monitoring (e.g. PDCCH monitoring) if the gNB is not using the appropriate beam during the UE's monitoring occasion.

If a UE is configured for periodic reception/transmission (e.g. PDCCH reception, periodic CSI-RS reception, configured grant PUSCH transmission, scheduling request, periodic CSI reporting, etc.), the gNB would need to ensure that the appropriate beam is being used at the configured time, assuming the transmission direction, DL or UL, is aligned with the configuration. This constraint can greatly limit the flexibility of the base station's scheduling activity.

In some embodiments, the base station may transmit a downlink control information (DCI) message (or messages) that dynamically indicates the Tx/Rx beams to be used in subsequent symbols in one or more slots. The DCI message may be carried in a Physical Downlink Control Channel. The DCI message may be either a group common message or a UE-specific message. The DCI message may include other information in addition to the indication of Tx/Rx beams. The DCI message may include indications of Tx/Rx beams for multiple carriers. (The base station may host a plurality of cells, each having a corresponding component carrier.)

The indication of Tx/Rx beams may be indicated separately from or jointly with a slot format indicator. A dynamic Slot Format Indicator (SFI), carried in downlink control information, may be used by the UE device to derive which symbols of a slot are uplink, which symbols are downlink, and which symbols are flexible.

In some embodiments, the base station may semi-statically configure the beams (or beam indicators, or beam directions) for one or more symbols in one or more slots, e.g., by transmitting Radio Resource Control (RRC) signaling to one or more UEs. Thus, the dynamic indication of beam information may be needed only for the remaining symbols, i.e., the symbols whose beam information is not semi-statically configured.

For example, a first symbol in a slot may be semi-statically configured with beam index equal to "unknown beam", in which case UEs may be required to monitor the PDCCH, e.g., to determine whether the base station has scheduled a data transmission or reception to/from the UE. As another example, a second symbol in the slot may be semi-statically configured with beam index equal to beam number 4. Thus, a UE that is covered by beam number 4 may transmit (or receive) in the second symbol. UEs that belong to beams other than beam number 4 may refrain from transmitting (or receiving) in the second symbol since doing so would be wasted effort.

In some embodiments, the base station may configure (or, a design constraint on the base station and UEs may define) which transmissions/receptions of a set of configured transmissions/receptions are affected by the dynamically signaled beam indication information. For example, periodic CSI-RS may not be affected by the beam indication information, in order to not affect the CSI measurement process at the UE. (CSI is an acronym for Channel State Information. RS is an acronym for Reference Signal.)

In some embodiments, for each symbol, the beam indication information may indicate either a beam index or an 'unknown' (or 'flexible') state. The mapping of the beam index to an actual beam may need to be defined for UEs (e.g., for the UEs in communication with the base station).

In some embodiments, a beam index referred to the dynamic beam indication information may be the same as a Synchronization Signal Block (SSB) index as defined in the 3GPP 5G NR standard.

In some embodiments, a mapping of the beam index to the TCI state (for DL) or the spatial relationship (for UL) may be UE-specifically configured, e.g., by RRC signaling. In this case, the base station may ensure the configurations are aligned among the group of UEs. The UE may recover beam indices from the dynamic beam indication information, and employ the configured mapping to look up corresponding TCI states for downlink receptions (or corresponding spatial relation indicators for uplink transmissions). Alternatively, the dynamic beam indication information may include indicators of TCI state (or indicators of spatial relation) instead of beam indices, and the UE may employ the indicators and the configured mapping to look up the corresponding beam indices.

An uplink transmissions from the UE or a downlink reception by the UE may be semi-statically configured by higher layer (e.g., RRC) signaling from the base station. Such transmissions and receptions may be referred to respectively as "configured transmissions" and "configured receptions". In contrast, a transmission or reception is said to be "scheduled" when it is dynamically indicated by the transmission of downlink control information (DCI) from the base station.

We contemplate at least two different types of 'unknown' state. For the first type of 'unknown' state, the UE may perform configured transmissions/receptions at their corresponding configured symbol times, and the base station may ensure that its receive/transmit beams for those symbol times are aligned with (or directed towards) the UE. The symbols where the base station performs omni-directional transmission/reception may be handled using this type of 'unknown' state. For the second type of 'unknown' state, the UE may not perform any configured transmissions/receptions, assuming the gNB may use any beam direction.

In some embodiments, one type of unknown state may be used (e.g., defined or configured). In other embodiments, both types of unknown state may be used.

It is also possible that different kinds of configured transmissions/receptions may be handled differently for an 'unknown' state. For example, suppose a UE is configured to perform periodic PDCCH monitoring and periodic CSI measurement. If the beam indication information indicates the "unknown" beam state for one or more symbols used by the PDCCH monitoring and the CSI measurement, the UE may still monitor the PDCCH, but not perform CSI measurement.

In some embodiments, scheduled transmissions/receptions to/from UEs may follow the same beam handling as indicated for the configured transmissions/receptions by the beam indication information. (These embodiments anticipate the possibility that the base station may make scheduling decisions that conflict with the DCI-based beam indication message. Thus, the UE may need to selectively ignore some of the scheduled transmissions or receptions.) In other embodiments, the UE may perform scheduled transmissions/receptions without checking the beam indication information, assuming that the base station (e.g., the gNB) does not make any conflicting scheduling decision.

In some embodiments, the DCI-based beam indication message may be a group common message, i.e., a message that is targeted for a group of UEs. In these embodiments, there are a number of cases that may be considered. In a first case, the DCI that carries the beam indication message may be transmitted in an omni-directional manner. In a second case, the DCI that carries the beam indication message may be transmitted using the same (or similar) kind of narrow beam as transmissions of the UE-specific control/data. In a third case, the DCI that carries the beam indication message may be transmitted using a beam that is wider than the narrow kind used for transmissions of UE-specific control/data, but not omni-directional. This third case is between the first case and the second case; each DCI would be able to reach UEs in more than one of the narrow beams. In the following paragraphs, each of the above cases will be described more fully.

Case 1: Omni-Directional Transmission of Group-Common Beam Indication Information If the DCI is group-common and transmitted omni-directionally, it can reach all the UEs within the cell. Thus, the DCI may carry the beam indication information for all directions used in the cell, e.g., for a set of directions spanning 360 degrees, or about 120 degrees in a sectorized cell.

In terms of how to indicate the beam information for the symbols in one or more slots, there may be different alternatives. In a first alternative, the beam information may be indicated for each symbol in the one or more slots. For example, if there are 30 beams, 5 bits are needed to indicate the beam information (30 beams+one 'unknown' state) for each symbol. Assuming 14 symbols in a slot, each slot requires 14*5=70 bits. More bits may be needed if the beam information for multiple slots is indicated. The corresponding overhead may be quite large. (Note that the values of parameters such as the number of slots, the number of symbols per slot, the number of beams may each take a variety of different values. The values given in the present example are not meant to be limiting.)

In a second alternative, to decrease overhead, the beam information may be indicated with a certain granularity of XG symbols, where XG is a positive integer. For example, with $X_G=2$, each beam indication state applies to two consecutive symbols. The value of X provides a tradeoff between the DCI overhead and the scheduling flexibility.

Note that some symbols in a slot (or a plurality of slots) may have semi-statically configured transmissions/receptions while other symbols of the slot do not. (Also, it is possible for a symbol to have more than one semi-statically configured transmission/reception, if desired.)

In a third alternative, the beam information may be provided only for selected beams and/or symbols in one or more slots. For example, the beam information may be indicated only for symbols with semi-statically configured transmissions/receptions (or a subset of those symbols), because the beam information may be most useful for controlling the behavior of semi-statically configured transmissions/receptions. (Thus, for each symbol, a UE may be informed on whether or not it is allowed to perform a semi-statically configured transmission or semi-statically configured reception during that symbol. For example, the gNB could configure two UEs that reside in different beams to transmit on the same symbol. Depending on which beam is indicated for the symbol, one of the two UEs would transmit.) The provision of beam information for other symbols may not be as useful because the UE may rely on dynamic DCI signaling to schedule transmission and/or receptions for those other symbols. Moreover, the number of symbols with semi-static configured transmissions/receptions in a slot may not be large compared to the number of symbols in a slot (or a plurality of slots).

Relating to the third alternative, several options for beam indication are contemplated, as described below. However, these options are not intended to be an exhaustive list. (Other approaches may be employed. In some embodiments, multiple options can also be supported, and the base station may configure or dynamically indicate which option is to be used.) We provide an example of signaling for each option. For these examples, we assume a total of 7 beams (with the beam index running from 0 to 6) plus an 'unknown' beam state, and each indication covers 14 symbols in a slot (with symbol index starting at 0). All the examples correspond to the case where symbol #2 uses beam #4 and symbol #3 uses beam #6. The examples assume the beam indication is for a single slot. For multiple slots, the same kind of indication can be repeated for each of the slots. Alternatively, the bitmap can be extended to cover multiple slots.

In a first option, the beam indication may include one or more pairs of the form (symbol index, beam index), wherein the symbol index spans one or more slots. For example, the indication may have two pairs: (2, 4) and (3, 6).

In a second option, the beam indication may include: a bitmap to identify the symbols for which beam information is transmitted; and the beam information for each of the identified symbols. For example, the beam indication may have a bitmap 00110000000000 for symbol indication, followed by the beam index values 4 and 6 for beam information. The bitmap has 14 entries corresponding respectively to the 14 symbols in a slot.

In a third option, the beam indication may include one or more pairs of the form (beam index, bitmap) for one or more slots. The bitmap indicates a set of symbols associated with the corresponding beam. Each position in the bitmap corresponds to a respective symbol position in the one or more slots. For example, the beam indication can have two such pairs:

(4, 00100000000000) and (6, 00010000000000).

In a fourth option, the beam indication may include: a beam bitmap to identify the beams to be indicated; and for each indicated beam, a corresponding symbol bitmap that indicates a set of symbols assigned to that beam. The positions in the beam bitmap correspond to respective beams. One (or more) of the positions may be used to represent the "unknown" beam state(s). The positions in the symbol bitmap correspond to respective symbols in the one or more slots. For example, the beam indication may have a bitmap 00001010 to indicate the beams 4 and 6, followed by bitmaps 00100000000000 and 00010000000000 for symbol indication.

The maximum number of symbols and/or the maximum number of beams to be included in the beam indication information may need to be defined or configured so that the base station and the UE have a common understanding of the maximum message length. For example, the base station may transmit a configuration signal to the UE(s) indicating that maximum number of symbols and/or the maximum number of beams.

We return now to the discussion of alternatives for beam indication in case 1 (omni-directional transmission). In a fourth alternative, a list of beam patterns for one or more slots may be pre-defined or configured (e.g., broadcast or UE-specifically configured), and the DCI-based dynamic beam indication may indicate the index of a beam pattern in the list. Each of the beam patterns specifies a beam index value for each symbol in a slot (or in a plurality of slots). The beam index values may correspond to respective beams. One (or more) of the beam index values may represent an "unknown" beam state(s). For example, a table such as that given below may be pre-defined or configured (or, partly pre-defined and partly configured). U denotes the unknown beam state.

| Table of Beam Patterns | |
|---|---|
| Beam Pattern Index | Beam Information (14 Symbols in a Slot) |
| 0 | (0, 0, 0, 0, 0, 0, 0, 1, 1, 1, 1, 1, 1, 1) |
| 1 | (2, 2, 2, 2, 2, 2, 2, 3, 3, 3, 3, 3, 3, 3) |
| 2 | (U, U, 0, 0, 0, 1, 1, 1, 2, 2, 2, 3, 3, 3) |
| 3 | (0, 0, 1, 1, 2, 2, 3, 3, U, U, U, U, U, U) |
| ... | ... |

As shown in the table, beam pattern index 0 corresponds to a pattern where the first 7 symbols are assigned the beam with beam index 0 and the last 7 symbols are assigned the beam with beam index 1. One or more beam pattern indices (with each index covering a different time duration) can be indicated in the DCI message. While the table above provides specific examples of beam patterns, it should be understood that a wide variety of other beam patterns may be used, as needed or desired, e.g., depending on application scenario or operating conditions. Furthermore, while the table assumes that a beam pattern includes 14 elements, corresponding to 14 symbols in a single slot, it should be understood that the number of slots and the number of symbols per slot may each take a variety of different values, as needed or desired.

The above table-based mechanism can significantly reduce the overhead of providing beam indication information via the DCI. However, it may be challenging to pre-define or configure such a table without substantially constraining the freedom of the base station's scheduling activity. This mechanism may be more practically realizable if the number of beams is small, and/or, the beam pattern is restricted (or mainly restricted) to the symbols with configured transmissions/receptions. This restriction of scope can greatly reduce the number of patterns needed.

In a fifth alternative, a list of virtual beam patterns for one or more slots may be pre-defined or configured (e.g., broadcast or UE-specifically configured), where each virtual beam pattern includes virtual beam indices, but not actual beam indices (or beam directions). Each of the virtual beam patterns specifies a virtual beam index for each symbols in a slot (or in a plurality of slots.) The dynamic DCI-based beam indication information may include: an index (or indices) of a virtual beam pattern in the list; and a mapping of the virtual indices in the virtual beam pattern to corresponding actual beam indices or unknown beam state.

For example, a table such as that shown below may be pre-defined or configured (or, partly pre-defined and partly configured). Note that the virtual beam indices in a virtual beam pattern do not directly correspond to actual beams. The meaning of each virtual beam index will be included as part of the dynamic beam indication information. For example, the dynamic beam indication information may indicate virtual beam pattern 0, and indicate that virtual index 0 corresponds to actual beam 3, and virtual index 1 correspond to actual beam 2. In this case, the first 7 symbols would correspond to actual beam 3, and the last 7 symbols would correspond to actual beam 2.

| Table of Virtual Beam Patterns | |
|---|---|
| Virtual Beam Pattern Index | Beam Information (14 Symbols in a Slot) |
| 0 | (0, 0, 0, 0, 0, 0, 0, 1, 1, 1, 1, 1, 1, 1) |
| 2 | (U, U, 0, 0, 0, 1, 1, 1, 2, 2, 2, 3, 3, 3) |
| 3 | (0, 0, 1, 1, 2, 2, 3, 3, U, U, U, U, U, U) |
| ... | ... |

This table-based mechanism may significantly reduce the number of patterns without introducing too great a constraint on the base station's scheduling, especially when there are a large number of beams in the system. For example, regardless of the number of beams in the system, the first entry in the table above can be used to indicate a pattern where two beams are used in a slot, where one of the two beams uses the first 7 symbols and the other uses the last 7 symbols. Which two beams are used may be dynamically indicated in the DCI. Furthermore, the virtual beam pattern may be restricted (or restricted mainly) to the symbols with configured transmissions/receptions, to further reduce the number of entries.

Case 2: Narrow-Beam Transmission of Group-Common Beam Indication Information As noted above, in a second case of group-common beam indication signaling, the DCI that carries the group-common beam indication information may be transmitted using the same (or similar) kind of narrow beam as the UE-specific control/data. In this second case, all the solutions described above in connection with the first case are still applicable, and any one or more of those solutions may be employed in the second case, as desired. The overhead for this second case may be reduced compared to the first case by indicating only the symbols (or other time units) associated with the narrow beam being used to transmit the present DCI. UEs covered by other beams likely won't receive the dynamic DCI transmission, and thus, it may be useless to transmit their beam indication information. (In other words, a UE may only need to know the subset of symbol durations that is associated with the beam in which it resides, and does not need to know exactly which beam(s) is (are) being used for symbols not associated with its beam.) In one embodiment, the beam indication information may include symbol indication information only for the narrow beam used to transmit the dynamic DCI, and remaining symbols of the slot (or other time interval) can be handled with the 'unknown' state. When defining the mapping of beam index to TCI state or spatial relationship, only the mapping for the beam that carries the DCI may be defined, and the remaining beams may be handled via 'unknown' state.

There are a variety of different ways to implement the above described customization of the beam indication information for each beam, to reduce the DCI overhead.

In a first alternative, the beam indication information may include a set of slot/symbol indices associated with the beam that carries the DCI transmission.

In a second alternative, the beam indication information may include a bitmap that indicates the slots/symbols associated with the beam that carries the DCI.

For both the first alternative and the second alternative, the UE may need to identify the beam in which the DCI is being received. A DCI message transmitted in a particular beam may also be received by a UE in the adjacent overlapping beams, in addition to the UEs in the particular beam. Therefore, a base station may provide a mechanism by which the UE can determine which beam the beam indication information is intended for. There are different options for identifying the beam, as described below. (These options are not intended to be an exhaustive list.)

According to a first option, the base station may explicitly add a beam index in the DCI, i.e., the beam index of the beam carrying the DCI.

According to a second option, the base station may implicitly indicate the beam index by scrambling the transmitted DCI with the beam index.

According to a third option, the base station may implicitly indicate the beam index by scrambling the Cyclic Redundancy Check (CRC) of the DCI message with the beam index in addition to scrambling the CRC with the Radio Network Temporary Identifier (RNTI).

With the second and third options, the UEs in adjacent overlapping beams will not be able to decode the DCI message successfully because they will be performing the descrambling using their own beam indices, which differ from the beam index of the beam carrying the DCI.

Case 3: Wide-Beam Transmission of Group-Common Beam Indication Information

As noted above, in a third case of group-common beam indication signaling, the DCI that carries the beam indication message may be transmitted using a beam that wider than that used for UE-specific control/data, but not omnidirectional. (For this third case, all the solutions discussed above in connection with the first case are still applicable.) The overhead for this third case can be reduced compared to the first case by indicating only the beams that are covered by the wide beam used for the DCI transmission. For example, the beam indication message may include only the beam indication information for the narrow beams that are covered by the wide beam used for the DCI transmission. The remaining beams can be handled via the 'unknown' state. When defining the mapping of the beam index to TCI state or spatial relationship, only the mapping for the corresponding beams may be defined, and the remaining beams may be handled via the 'unknown' state(s).

UE-Specific Message

In some embodiments, if the indication is via a UE-specific message, all the solutions for group-common messaging are still applicable. However, because this is a UE-specific message, the DCI overhead can be reduced in general by not including the exact beam indices for the beams that are not of interest to this particular UE. These beams can be handled via 'unknown' state(s).

FIG. 8—Method for Operating a Base Station

In one set of embodiments, a method 800 for operating a base station (BS) may include the operations shown in FIG. 8. (The method 800 may also include any subset of the features, elements or operations described above.) The method may be performed by processing circuity of the base station, e.g., by the processing element 710 of base station 700.

At 810, the processing circuitry may transmit downlink control information (DCI) including beam indication information. The beam indication information may indicate: (a) one or more temporal units in a sequence of temporal units in a temporal interval; and (b) for each of the one or more temporal units, a corresponding index of a beam (or beam direction) to be used for base station transmission or base station reception during that temporal unit. The corresponding beam index may be selected from an available set of beam indices. The beam indices of the available set (or a subset of those beam indices) may correspond to beams used by the base station to perform communications (e.g., UE-specific communications) with user equipment (UE) devices. The directions of the beams may be spread out to cover a region of space. The beams may (or may not) be of uniform width.

In the case where the one or more temporal units constitute a plurality of temporal units, those units are not necessarily contiguous.

In some embodiments, the base station may be a gNB according to the 3GPP 5G NR standard.

In some embodiments, the downlink control information may be a group common message, targeted for a group of user equipment (UE) devices.

In some embodiments, the downlink control information may be targeted for a specific user equipment (UE) device, in which case, the beam indication information may relate only to the beam in which the UE device resides, e.g., as variously described above.

In some embodiments, the DCI may include beam indication information for each of a plurality of carriers hosted by the base station.

In some embodiments, for each of the one or more temporal units, the DCI may also include an indication of an uplink or downlink direction of data flow during that temporal interval.

In some embodiments, the one or more temporal units indicated by the beam indication information may be constrained to be among temporal units whose beam indications are not semi-statically configured.

In some embodiments, the beam indication information applies only to a selected subset of a set of configured transfers. The set of configured transfers may include (or consist of) one or more configured downlink transmissions and/or one or more configured uplink receptions. The selected subset may be indicated to one or more UEs by configuration signaling (e.g., RRC signaling transmitted by the base station). Alternatively, the selected subset may be predefined.

In some embodiments, one of the beam indices of said available set represents an unknown state, in which case the beam indication information may be set so it indicates the unknown state for a particular temporal unit. This setting of the beam indication information may direct a user equipment (UE) device to perform a configured transmission or reception during the particular temporal unit. (In this situation, the UE may not know which beam the base station is using during the particular temporal unit, and it does not need to make any assumption on the beam being used. The UE may simply perform the configured transmission/reception as defined by the configuration.)

In some embodiments, one of the beam indices of said available set represents an unknown state, in which case the beam indication information may be set so it indicates the unknown state for a particular temporal unit. This setting of the beam indication information may direct a user equipment (UE) device to not perform any configured transmission or reception during the particular temporal unit.

In some embodiments, the beam indices of the available set may include Synchronization Signal Block (SSB) indices, e.g., SSB indices as defined in the 3GPP 5GNR standard.

In some embodiments, the beam configuration information may indicate a beam for a temporal unit by indicating a Transmission Configuration Indication (TCI) state or a spatial relation for the temporal unit. In these embodiments, the method 800 may also include transmitting configuration information to a user equipment (UE) device, where the configuration information configures a mapping of beam index to Transmission Configuration Indication (TCI) state or spatial relation for the UE device.

In some embodiments, the temporal interval may span one or more slots.

In some embodiments, the DCI may be transmitted omni-directionally.

In some embodiments, the DCI may be transmitted using the same beam as a UE-specific transmission in one of the one or more temporal units, in which case, the beam indication information may include symbol indication information only for said beam used to transmit the DCI.

In some embodiments, a subset of the beam indices of the available set correspond to respective beams used for UE-specific communications with user equipment (UE) devices. In these embodiments, the DCI may be transmitted using one of said beams, in which case, the beam indication information may include symbol indication information only for the one beam used to transmit the DCI.

In some embodiments, the base station transmits the DCI using a beam that corresponds to a one of the beam indices of the available set. In this case, the beam index may be included in the DCI. Alternatively, the DCI may be scrambled with the beam index. As another alternative, a Cyclic Redundancy Check (CRC) of the DCI may be scrambled with the beam index.

In some embodiments, the DCI may be transmitted using a beam that (a) includes a plurality of UE-specific communication beams and (b) is not omni-directional. In these embodiments, the beam indication information may be limited to information (e.g., symbol indication information) relating to the plurality of UE-specific communication beams.

In some embodiments, a subset of the beam indices of the available set correspond to respective beams used for UE-specific communications with user equipment (UE) devices. In these embodiments, the DCI may be transmitted using a wide beam that (a) includes or covers a plurality of the UE-specific communication beams and (b) is not omni-directional. The beam indication information may be limited to information relating to the plurality of UE-specific communication beams within the wide beam.

In some embodiments, a first of the one or more beams may be used for base station transmission, and a second of the one or more beams may be used for base station reception.

In some embodiments, the one or more temporal units indicated by the beam indication information may be limited to temporal units corresponding to semi-statically configured transfers (where each of the semi-statically configured transfers is a semi-statically configured downlink transmission or a semi-statically configured uplink reception), e.g., as variously described above. These transfers may be configured by higher layer signaling such as Radio Resource Control (RRC) signaling.

In some embodiments, the beam indication information may indicate a beam pattern from a predetermined list of beam patterns, where each of the beam patterns specifies a beam index (from the available set) for each of the temporal units of the temporal interval. The base station may determine (or partially determine) the list by sending configuration messages to the UE device(s).

In some embodiments, the beam indication information may indicate a virtual beam pattern from a predetermined list of virtual beam patterns, where each of the virtual beam patterns specifies a virtual beam index for each of the temporal units of the temporal interval. The beam indication information may also include a mapping of one or more virtual beam indices to one or more corresponding actual beam indices.

In some embodiments, a base station may include: a radio subsystem; processing circuitry coupled to the radio subsystem; and memory storing program instructions. The program instructions, when executed by the processing circuitry, may cause the base station to perform any of the above described method embodiments.

In some embodiments, a method for operating a base station (BS) may include transmitting downlink control information (DCI) including beam indication information, wherein the beam indication information indicates: one or more temporal units in a sequence of the temporal units in a temporal interval; and for each of the one or more temporal units, a corresponding index of a beam to be used for base station transmission or base station reception during that temporal unit, wherein the corresponding beam index is selected from an available set of beam indices.

In some embodiments, the downlink control information be a group common message, targeted for a group of user equipment (UE) devices.

In some embodiments, the downlink control information is targeted for a specific user equipment (UE) device, wherein the beam indication information relates only to the beam in which the UE device resides.

In some embodiments, the DCI includes beam indication information for each of a plurality of carriers hosted by the base station.

In some embodiments, for each of the one or more temporal units, the DCI also includes an indication of an uplink or downlink direction of data flow during that temporal interval.

In some embodiments, said one or more temporal units are constrained to be among temporal units whose beam indications are not semi-statically configured.

In some embodiments, the beam indication information applies only to a selected subset of a set of configured transfers, wherein the set of configured transfers includes one or more configured downlink transmissions and/or one or more configured uplink receptions, wherein the selected subset is indicated to one or more UEs by configuration signaling, or predefined.

In some embodiments, one of the beam indices of said available set represents an unknown state, wherein the beam indication information is set so it indicates the unknown state for a particular temporal unit, wherein said setting directs a user equipment (UE) device to perform a configured transmission or reception during the particular temporal unit.

In some embodiments, one of the beam indices of said available set represents an unknown state, wherein the beam indication information is set so it indicates the unknown state for a particular temporal unit, wherein said setting directs a user equipment (UE) device to not perform any configured transmission or reception during the particular temporal unit.

In some embodiments, the beam indices of the available set include SSB indices.

In some embodiments, the beam configuration information indicates a beam for a temporal unit by indicating a Transmission Configuration Indication (TCI) state or spatial relation for the temporal unit.

In some embodiments, the temporal interval spans one or more slots.

In some embodiments, the DCI is transmitted omni-directionally.

In some embodiments, the DCI is transmitted using a same beam as a UE-specific transmission in one of the temporal units, wherein the beam indication information includes symbol indication information only for said beam.

In some embodiments, the DCI is transmitted using a beam that corresponds to one of the beam indices of the available set, wherein: the beam index is included in the DCI; or the DCI is scrambled with the beam index; or a Cyclic Redundancy Check (CRC) of the DCI is scrambled with the beam index.

In some embodiments, the DCI is transmitted using a beam that (a) includes a plurality of UE-specific communication beams and (b) not omni-directional, wherein the beam indication information is limited to information relating to the plurality of UE-specific communication beams.

In some embodiments, a first of the one or more beams is used for base station transmission, wherein a second of the one or more beams is used for base station reception.

In some embodiments, the one or more temporal units are limited to temporal units corresponding to semi-statically configured transfers, wherein each of the semi-statically configured transfers is a semi-statically configured downlink transmission or a semi-statically configured uplink reception.

In some embodiments, the beam indication information indicates a beam pattern from a predetermined list of beam patterns, wherein each of the beam patterns specifies a beam index for each of the temporal units of the temporal interval.

In some embodiments, the beam indication information indicates: a virtual beam pattern from a predetermined list of virtual beam patterns, wherein each of the virtual beam patterns specifies a virtual beam index for each of the temporal units of the temporal interval; and a mapping of one or more virtual beam indices to one or more corresponding actual beam indices.

FIG. 9—Method for Operating a User Equipment (UE) Device

In one set of embodiments, a method 900 for operating a user equipment (UE) device may include the operations shown in FIG. 9. (The method 900 may also include any subset of the features, elements or operations described above.) The method may be performed by processing circuitry of the UE device, e.g., by the processing element 610 of user equipment 600.

At 910, the processing circuitry may receive downlink control information (DCI) including beam indication information. The beam indication information may indicate: (a) one or more temporal unit in a sequence of temporal units in a temporal interval; and (b) for each of the one or more temporal units, a corresponding index of a beam (or beam direction) to be used by a base station to perform downlink transmission or uplink reception during that temporal unit, wherein the corresponding beam index is selected from an available set of beam indices. For example, the sequence of temporal units may span a slot (or a plurality of slots).

In some embodiments, the base station may be configured to communicate with a gNB according to the 3GPP 5G NR standard.

In some embodiments, the downlink control information may be a group common message, targeted for a group of UE devices.

In some embodiments, the downlink control information may be targeted only for the UE device, in which case, the beam indication information may relate only to the beam in which the UE device resides, e.g., as variously described above. For example, the one or more temporal units may be limited to those temporal units that relate to said beam which the UE device resides.

In some embodiments, the DCI may include beam indication information for each of a plurality of carriers.

In some embodiments, for each of the one or more temporal units, the DCI may also include an indication of an uplink or downlink direction of data flow during that temporal interval.

In some embodiments, said one or more temporal units may be constrained to be among temporal units whose beam indications are not semi-statically configured.

In some embodiments, the beam indication information may apply only to a selected subset of a set of configured transfers. The set of configured transfers may include (or consist of) one or more configured uplink transmissions and/or one or more configured downlink receptions. The selected subset may be determined by received configuration signaling (e.g., RRC signaling). Alternatively, the selected subset may be predefined.

In some embodiments, one of the beam indices of said available set may represent an unknown state. In these embodiments, the method may also include, in response to determining that the beam indication information is set so that it indicates the unknown state for a particular temporal unit, performing a configured transmission or reception during the particular temporal unit.

In some embodiments, one of the beam indices of said available set represents an unknown state. In some embodiments, the method may also include, in response to determining that the beam indication information is set so that it indicates the unknown state for a particular temporal unit, refraining from performing any configured transmission or reception during the particular temporal unit.

In some embodiments, the beam indices of the available set may include Synchronization Signal Block (SSB) indices.

In some embodiments, the beam configuration information may indicates a beam for a temporal unit by indicating a Transmission Configuration Indication (TCI) state or a spatial relation for the temporal unit. In these embodiments, the method 900 may also include receiving configuration information from a base station that configures a mapping between beam index and Transmission Configuration Indication (TCI) state or spatial relation for the UE device.

In some embodiments, the temporal interval may span one or more slots.

In some embodiments, the temporal units may be symbol durations.

In some embodiments, the beam indication information may be limited to information relating to a beam used to transmit the DCI.

In some embodiments, the method may also include determining whether a first beam used to transmit the DCI is the same as a second beam in which the UE resides. The action of determining may include recovering a beam index included in the DCI, and comparing that beam index to a beam index of the second beam. Alternatively, said determining may include attempting to descramble the DCI using the beam index of the second beam. As yet another alternative, said determining may include attempting to descramble a CRC of the DCI using the beam index of the second beam.

In some embodiments, the beam indication information may be limited to information (e.g., symbol indication information) relating to two or more UE-specific communication beams contained within a beam used to transmit the DCI. The symbol indication information for a given beam indicate one or more symbols that will use the given beam.

In some embodiments, a first of the one or more beams may be used for transmission by the UE device, and a second of the one or more beams may be used for reception by the UE device.

In some embodiments, the one or more temporal units may be limited to temporal units corresponding to semi-statically configured transfers, where each of the semi-statically configured transfers is a semi-statically configured uplink transmission or a semi-statically configured downlink reception.

In some embodiments, the beam indication information may indicate a beam pattern from a predetermined list of beam patterns, where each of the beam patterns specifies a beam index for each of the temporal units of the temporal interval.

In some embodiments, the beam indication information may indicate a virtual beam pattern from a predetermined list of virtual beam patterns, wherein each of the virtual beam patterns specified a virtual beam index for each of the temporal units of the temporal interval. The beam indication information may also indicate a mapping of one or more virtual beam indices to one or more corresponding actual beam indices.

In some embodiments, the method 900 may also include performing a scheduled transmission or scheduled reception of data in one of the one or more temporal units without reference to a beam index indicated by the beam indication information.

In some embodiments, a user equipment (UE) device may include: a radio subsystem; processing circuitry coupled to the radio subsystem; and memory storing program instructions. The program instructions, when executed by the processing circuitry, may cause the UE device to perform any of the method embodiments described above.

Figure 10:
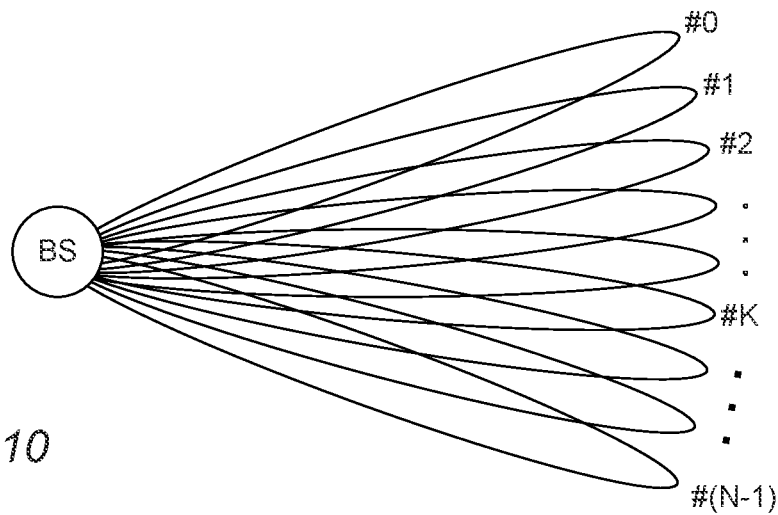
FIG. 10 illustrates an example of an available set of beams that are usable by a base station to transmit and/or receive with user equipment (UE) devices, according to some embodiments.

FIG. 10 illustrates an available set of beams useable by a base station (BS) for transmissions and/or receptions with UEs, according to some embodiments. The base station may employ the beams in the time multiplexed fashion to communicate with different UEs or different subsets of UEs. The beams may be identified by respective beam index values. For example, the illustrated beams are indexed from zero to N−1. The beams to be used over any given interval of time may depend on the spatial distribution of the UEs. Each UE may determine the beam in which it currently resides, e.g., by performing signal power measurements during a beam scan procedure where the base station scans through the beams of the available set.

Figure 11:
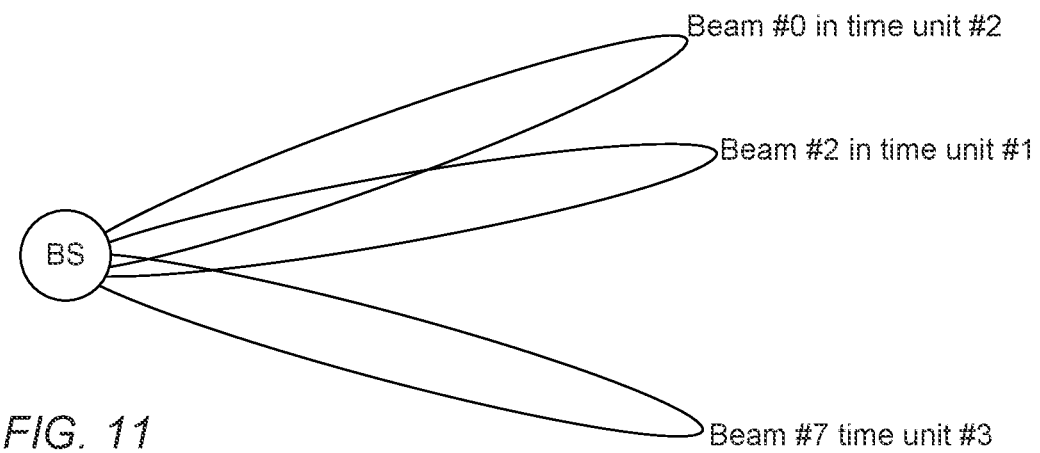
FIGS. 11 and 12 illustrate a particular example of the time multiplexing of beams over a sequence of time units (time durations) in a time interval, according to some embodiments.
Figure 12:
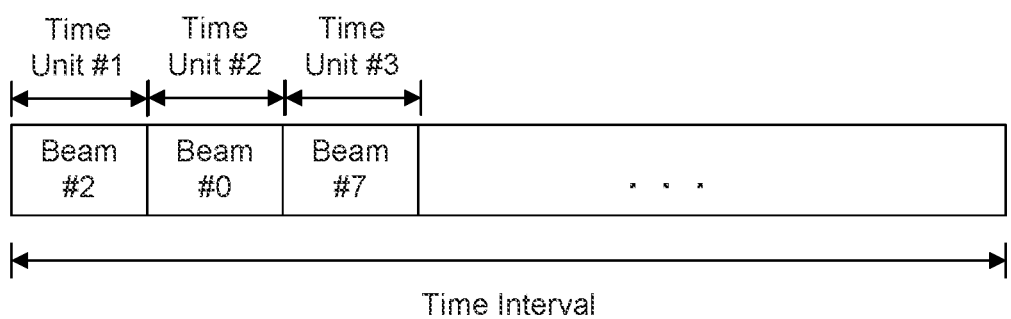

FIGS. 11 and 12 illustrate an example of different beams in the available set being used to transmit (or receive) at different time units in a time interval, according to some embodiments. Beam #2 is used in time unit #1; beam #0 is used in time unit #2; beam #7 is used at time unit #3; and so forth. (The specific values used in this example meant to be illustrative, and a wide variety of different values are contemplated.) The base station may transmit a dynamic DCI-based indication of the beams used in respective time units of the time interval, e.g., as variously described above.

FIG. 13—Method for Operating a Base Station

In one set of embodiments, a method 1300 for operating a base station (BS) may include the operations shown in FIG. 13. (The method 1300 may also include any subset of the features, elements or operations described above.) The method may be performed by processing circuity of the base station, e.g., by the processing element 710 of base station 700.

At 1310, the processing circuitry may transmit downlink control information (DCI) including beam indication information. The beam indication information may dyanmically indicate an index of a beam to be used for base station transmission or base station reception during a particular temporal unit in a temporal interval. The temporal interval may be divided into a sequence of temporal units, of which the particular temporal unit is one.

In some embodiments, for each of one or more beams in an available set of beams, the beam indication information may indicate which one or more temporal units of the temporal interval are assigned (by the base station) to that beam.

In some embodiments, for each of one or more temporal units of the temporal interval, the beam indication information may indicate which beam of an available set of beams is assigned (by the base station) for transmission or reception in that temporal unit.

FIG. 14—Method for Operating a User Equipment (UE) Device

In one set of embodiments, a method 1400 for operating a user equipment (UE) device may include the operations shown in FIG. 14. (The method 1400 may also include any subset of the features, elements or operations described above.) The method may be performed by processing circuitry of the UE device, e.g., by the processing element 610 of user equipment 600.

At 1410, the processing circuitry may receive downlink control information (DCI) including beam indication information. The beam indication information may dynamically indicate an index of a beam to be used by a base station to perform downlink transmission or uplink reception during a particular temporal unit in a temporal interval. The temporal interval may be divided into a sequence of temporal units, of which the particular temporal unit is one.

In some embodiments, for each of one or more beams in an available set of beams, the beam indication information may indicate which one or more temporal units of the temporal interval are assigned (by the base station) to that beam.

In some embodiments, for each of one or more temporal units of the temporal interval, the beam indication information may indicate which beam of an available set of beams is assigned (by the base station) for transmission or reception in that temporal unit.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, etc.

Any of the methods described herein for operating a user equipment (UE) in communication with a base station (or transmission-reception point) may be the basis of a corresponding method for operating a base station (or transmission-reception point), by interpreting each message/signal X received by the UE in the downlink as a message/signal X transmitted by the base station (or transmission-reception point), and each message/signal Y transmitted in the uplink by the UE as a message/signal Y received by the base station (or transmission-reception point).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

We claim:
1. A method, comprising:
receiving downlink control information (DCI) including beam indication information, wherein the beam indication information indicates:
one or more temporal units in a sequence of 14 symbols in a slot;
for each of the one or more temporal units, an indication of an uplink or downlink direction of data flow during that temporal interval; and
a first beam pattern from a predetermined list of multiple beam patterns, wherein each beam pattern of the predetermined list of beam patterns specifies a respective beam index for each respective temporal unit of the slot, wherein each beam pattern includes changing beams at least once during the slot and at least a subset of the beam patterns of the predetermined list of beam patterns includes using at least 3 different beams during the slot.

2. The method of claim 1, wherein the downlink control information is a group common message, targeted for a group of user equipment (UE) devices.

3. The method of claim 1, wherein the downlink control information is targeted only for a receiving user equipment (UE) device, wherein the beam indication information relates only to the beam in which the UE device resides.

4. The method of claim 1, wherein said one or more temporal units are constrained to be among temporal units whose beam indications are not semi-statically configured.

5. The method of claim 1, wherein the beam indication information applies only to a selected subset of a set of configured transfers, wherein the set of configured transfers includes one or more configured uplink transmissions and/or one or more configured downlink receptions, wherein the selected subset is determined by received configuration signaling, or predefined.

6. The method of claim 1, wherein the beam indication information indicates a beam for a temporal unit by indicating a Transmission Configuration Indication (TCI) state or spatial relation for the temporal unit.

7. The method of claim 1, further comprising:
determining whether a first beam used to transmit the DCI is the same as a second beam in which a user equipment (UE) device resides, wherein said determining includes:
recovering a beam index included in the DCI and comparing that beam index to a beam index of the second beam; or
attempting to descramble the DCI using a beam index of the second beam; or
attempting to descramble a CRC of the DCI using a beam index of the second beam.

8. The method of claim 1, wherein the beam indication information is limited to information relating to two or more user equipment (UE)-specific beams contained within a beam used to transmit the DCI.

9. The method of claim 1, wherein a first beam is used for transmission by a user equipment (UE) device, wherein a second beam is used for reception by the UE device.

10. The method of claim 1, wherein the one or more temporal units are limited to temporal units corresponding to semi-statically configured transfers, wherein each of the semi-statically configured transfers is a semi-statically configured uplink transmission or a semi-statically configured downlink reception.

11. The method of claim 1, wherein the beam indication information indicates:
a virtual beam pattern from a predetermined list of virtual beam patterns, wherein each of the virtual beam patterns specifies a virtual beam index for each of the temporal units of the temporal interval; and
a mapping of one or more virtual beam indices to one or more corresponding actual beam indices.

12. The method of claim 1, further comprising:
performing a scheduled transmission or scheduled reception of data in one of the one or more temporal units without reference to a beam index indicated by the beam indication information.

13. The method of claim 1, wherein the beam indication information is indicated with a granularity of XG symbols, wherein XG is equal to 2.

14. A method, comprising:
transmitting downlink control information (DCI) including beam indication information, wherein the beam indication information indicates:
one or more temporal units in a sequence of 14 symbols in a slot;
for each of the one or more temporal units, an indication of an uplink or downlink direction of data flow during that temporal interval; and
a first beam pattern from a predetermined list of multiple beam patterns, wherein each beam pattern of the predetermined list of beam patterns specifies a respective beam index for each respective temporal unit of the slot, wherein each beam pattern includes changing beams at least once during the slot and at least a subset of the beam patterns of the predetermined list of beam patterns using at least 3 different beams during the slot.

15. The method of claim 14, wherein the beam indication information is indicated with a granularity of XG symbols, wherein XG is equal to 2.

16. The method of claim 14, wherein the beam indication information indicates:
a virtual beam pattern from a predetermined list of virtual beam patterns, wherein each of the virtual beam patterns specifies a virtual beam index for each of the temporal units of the temporal interval; and
a mapping of one or more virtual beam indices to one or more corresponding actual beam indices.

17. A processor comprising:
a baseband processor; and
a memory management unit (MMU), the baseband processor and the MMU configured to perform operations comprising:
receiving downlink control information (DCI) including beam indication information, wherein the beam indication information indicates:
one or more temporal units in a sequence of 14 symbols in a slot;
for each of the one or more temporal units, an indication of an uplink or downlink direction of data flow during that temporal interval; and
a first beam pattern from a predetermined list of multiple beam patterns, wherein each beam pattern of the predetermined list of beam patterns specifies a respective beam index for each respective temporal unit of the slot, wherein each beam pattern includes changing beams at least once during the slot and at least a subset of the beam patterns of the predetermined list of beam patterns includes using at least 3 different beams during the slot.

18. The processor of claim 17, wherein the downlink control information is a group common message, targeted for a group of user equipment (UE) devices.

19. The processor of claim 17, wherein the beam indication information is indicated with a granularity of XG symbols, wherein XG is equal to 2.

* * * * *